Feb. 21, 1961     O. K. KELLEY     2,972,498
AUTOMOTIVE VEHICLE
Filed Aug. 25, 1959     3 Sheets-Sheet 1
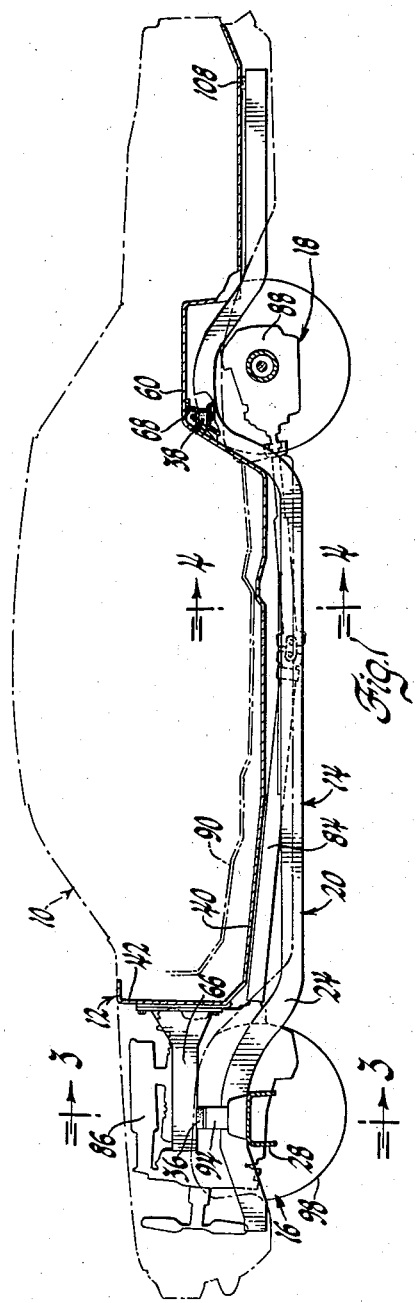
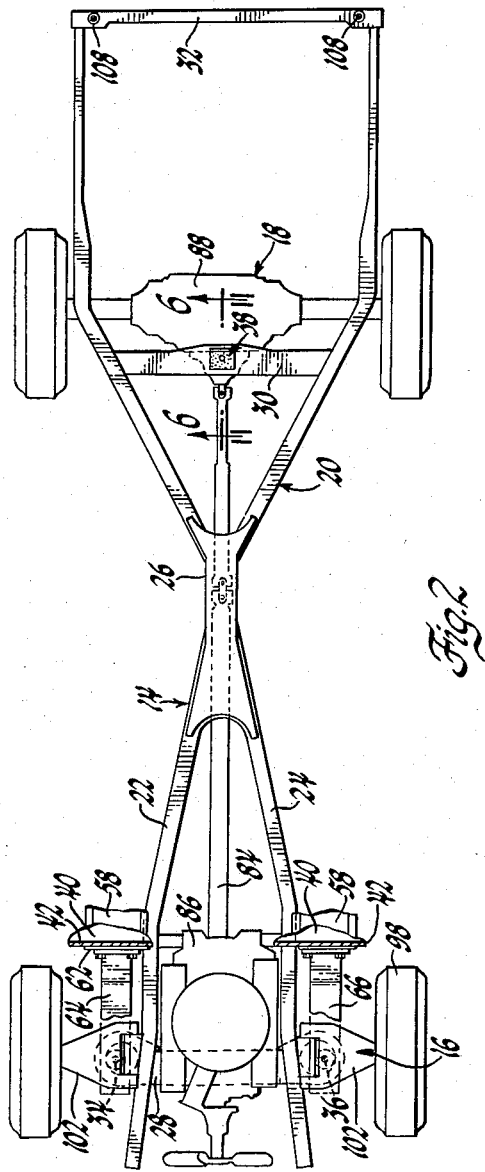
INVENTOR.
Oliver K. Kelley
BY
D. D. McGraw
ATTORNEY Feb. 21, 1961  O. K. KELLEY  2,972,498
AUTOMOTIVE VEHICLE
Filed Aug. 25, 1959  3 Sheets-Sheet 2

INVENTOR.
Oliver K. Kelley
BY
D. D. McGraw
ATTORNEY

Feb. 21, 1961     O. K. KELLEY     2,972,498
AUTOMOTIVE VEHICLE
Filed Aug. 25, 1959     3 Sheets-Sheet 3
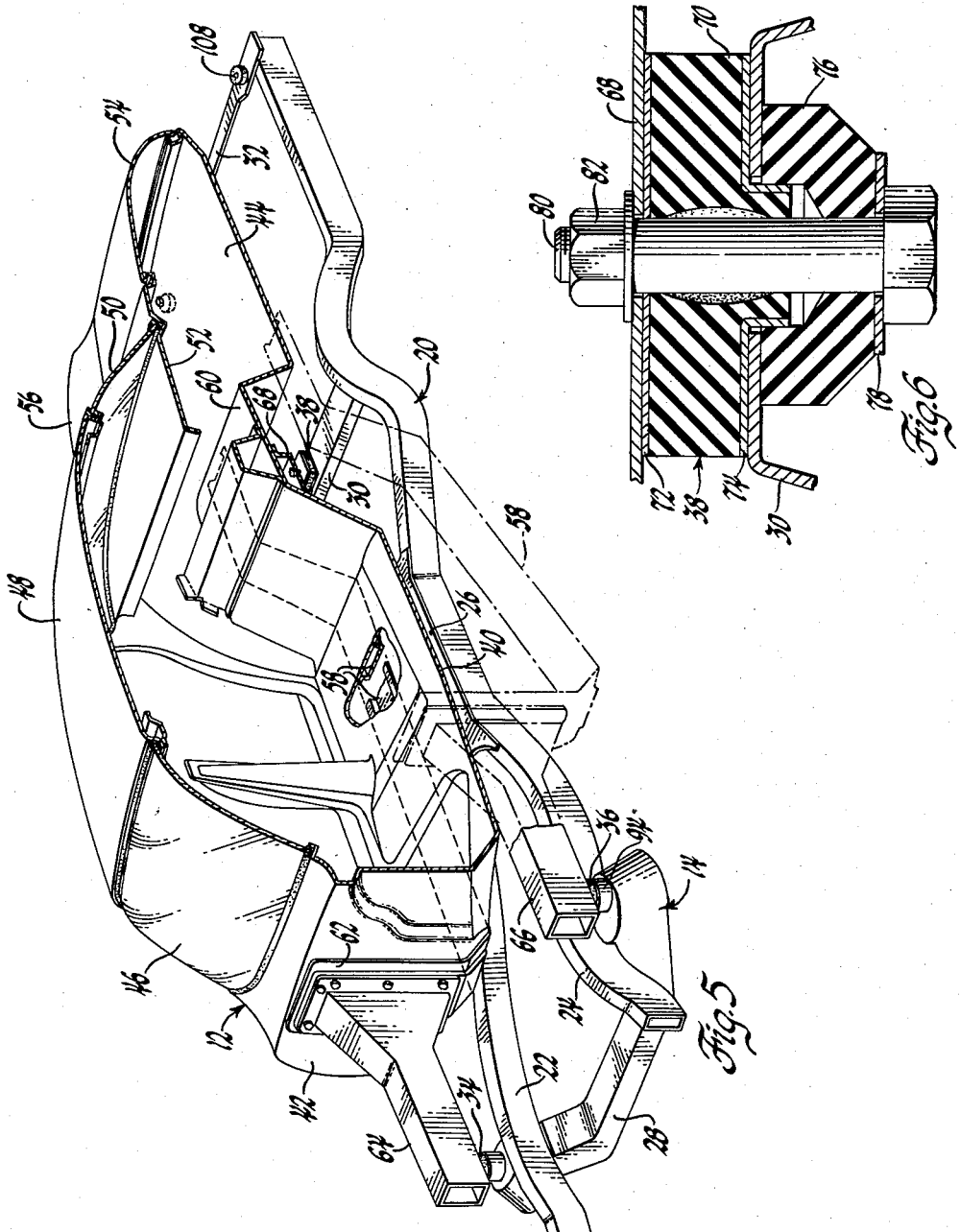
INVENTOR.
Oliver K. Kelley
BY
D. D. McGraw
ATTORNEY

United States Patent Office 2,972,498
Patented Feb. 21, 1961

2,972,498
AUTOMOTIVE VEHICLE

Oliver K. Kelley, Bloomfield Hills, Mich., assignor to General Motors Corporation, Detroit, Mich., a corporation of Delaware Filed Aug. 25, 1959, Ser. No. 835,992

6 Claims. (Cl. 296—28)

The invention relates to an automotive vehicle and more particularly to one which will provide greater seating comfort, ease of entry, and riding qualities than vehicles now on the market. It will also result in a lesser total vehicle cost due to the reduction of materials required. A vehicle embodying the invention utilizes a novel vehicle body mount and support system which in cooperation with a novel vehicle chassis unit provides a vehicle having the desirable characteristics noted.

The vehicle is provided with a substantially flat floor which extends the entire width of the body, thereby eliminating the high rocker sill construction which has been commonly used in conjunction with the lowering of the vehicle lines. The vehicle also reduces the drive tunnel to a minimum and further improves seating comfort. It results in additional trunk space by permitting the trunk floor to be lowered.

The vehicle is constructed of two units. The body unit is formed into a bridge-truss structure so that the upper portions thereof take compression loading and the lower portion takes tension loading to fully support the body load independently of the vehicle frame. The body is thus an inherent stiff bridge structure with the floor in tension and the roof in compression. This permits the entire structure to be mounted on the chassis in a single mounting plane defined by three mounting points. Such a mounting system provides for elimination of torsional distortion of the body and a minimum amount of noise transmission to the body. Since the frame is not required to take the entire body load, a light weight frame may be used and the conventional side rails and heavy load-carrying rocker sills may be eliminated. This permits the body rocker panels to be lowered as well as the front and rear seat floors. An increase in useable front and rear seat height is obtained without an increase in overall vehicle height. The steering wheel location and angle are also improved and the various control pedals such as the brake and accelerator pedals can be positioned for maximum comfort and ease of operation. The structure lends itself to unit assemblies with the front assembly including the engine and wheel suspension system and a rear assembly which may include the transmission and rear axle units as well as the rear suspension system.

In the drawings:

Figure 1 is a side view of a vehicle embodying the invention with parts shown in section and in phantom.

Figure 2 is a plan view of the chassis unit of the vehicle of Figure 1 and also illustrating a portion of the body mounting system. Parts are broken away and in section.

Figure 5 is an isometric view of the vehicle of Figure 1 with parts broken away, in section and in phantom.

Figure 6 is a partial section view of the rear body mount taken in the direction of arrows 6—6 of Figure 2.

Figure 3:
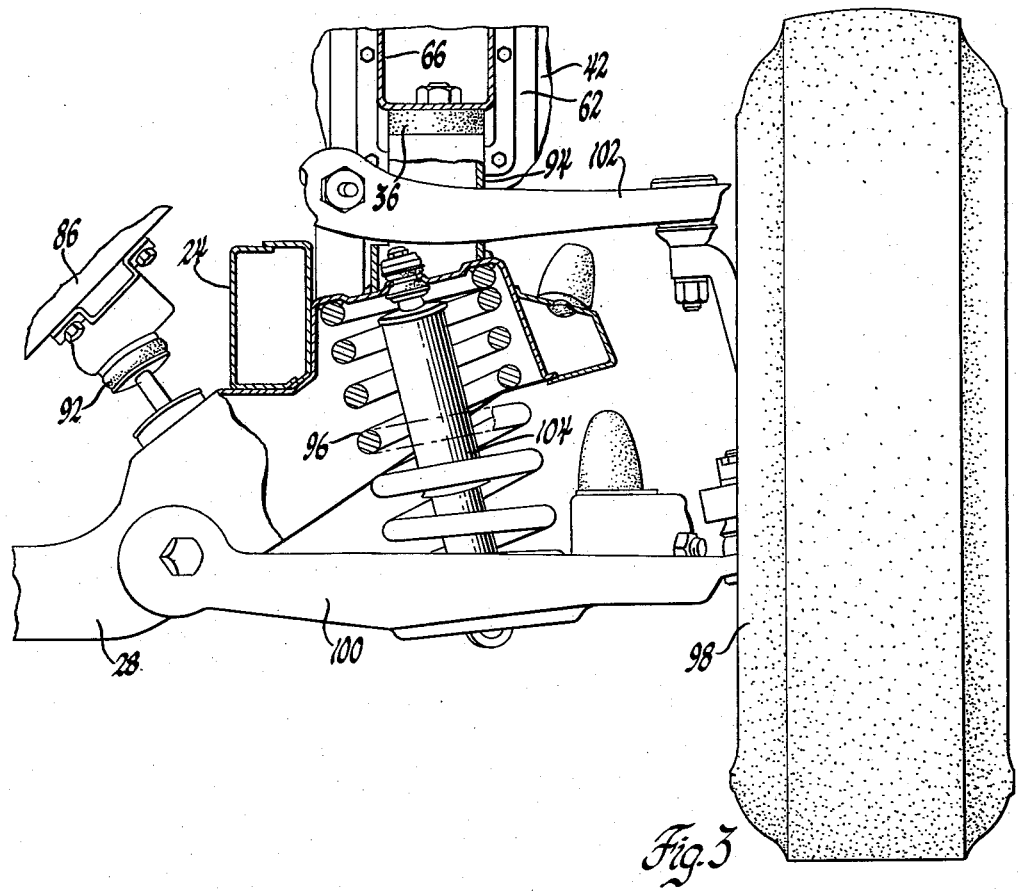
Figure 3 is a cross section view of a portion of the front assembly of the vehicle as taken in the direction of arrows 3—3 of Figure 1.

The vehicle 10 is assembled with a body unit 12, a chassis unit 14, a front engine and suspension assembly 16 and a rear transmission and axle assembly 18, together with connections therebetween to provide an operative vehicle. The chassis unit 14 includes a frame 20 which is illustrated as being of the cruciform type and having a right longitudinal member 22 and a left longitudinal member 24 joined at their center to provide a tunnel section 26. A front cross member 28 and a rear cross member 30 are also provided. Another cross member 32 may extend between the rear ends of the longitudinal members 22 and 24. This frame is preferably of relatively light construction and may be of channel, I-beam, or tubular construction. It is illustrated in the drawings as being formed of a tubular section of rectangular cross section. The frame is not required to bear the vehicle load as is the frame in vehicles now on the market. Its prime function is to tie together the front assembly 16 and the rear assembly 18 so as to maintain the wheel base of the vehicle. It also provides mounting spots for the vehicle body unit 12.

It is preferred that three vehicle body mounts be utilized in order to maintain the body in a single plane. This type mounting provides maximum noise isolation together with elimination of torsional distortion of the body. Modified versions of this mount may also be used, however, such as the provision of two mounts at the rear instead of the one illustrated. Of the three mounts preferably used, two mounts 34 and 36 are located on the front cross member 28 and the third mount 38 is located on the rear cross member 30. These mounts are preferably resilient and a typical rear mount is illustrated in Figure 6.

The vehicle body unit is constructed to act as a bridge-truss. Thus the upper truss member will be in compression and the lower truss member will be in tension. The floor pan 40 of the body extends on the lower side of the body from the fire wall 42 to the rear of the body and provides the floor in the passenger area as well as the floor of the vehicle trunk compartment 44. The fire wall extends upwardly to a point adjacent the windshield 46. The vehicle roof 48 extends from the top of the windshield rearwardly to the upper side of the back-light 50. The lower side of the back-light is attached to the body panel 52 which together with the deck lid 54 and the vehicle side panels 56 form the trunk compartment 44.

The windshield 46, roof 48 and back-light 50 co-operate to provide the upper bridge truss member which is normally in compression. In order to effectively utilize the windshield and the back-light in this manner, they are preferably mounted rigidly in place so that they can take full compression loading. This may be accomplished by filling the clearance between the rubber glass sills and the body opening with a hardening material. In addition, tension stringers 58 may be secured to the under floor 40 between the fire wall 42 and the rear kick-up pan 60. This arrangement provides an inherently stiff bridge-truss structure with the floor in tension and the roof in compression. Motion of the windshield and back-light in their mounts is eliminated and permits the mounting of the entire body unit to the chassis unit at the three points noted with the desired results and the advantages being obtained.

The fire wall 42 may be reinforced by plates 62 which extend to the forward ends of the tension stringers 58 and upwardly to a point adjacent the upper end of the fire wall 42. Body mounting arms 64 and 66 are suitably secured to fire wall 42 and plates 62 and extend forwardly to the forward mounts 34 and 36 so as to support the body unit at these two points. Mounting arms 64 and 66 may be constructed of sheet metal into a generally tubular cross section of varying demensions as illustrated in order to provide sufficient strength with minimum weight.

The rear mount 38 may be attached to the body unit adjacent the rear kick-up pan 60 by means of a cross-member 68 which is attached to the underside of the floor pan 40. The rear mount may include a rubber pad 70 received intermediate the cross member 68 and the cross member 30. Metal plates 72 and 74 may be bonded to either side of pad 70. A second rubber pad 76 may be received underneath cross member 30 and have a lower plate 78 bonded thereto. A bolt 80 which extends through the rubber pads 70 and 76 holds these pads in compression when the nut 82 is tightened in place. The front mounts may be of a somewhat similar construction if desired.

The drive shaft 84 may extend between the engine 86 and the transmission-rear axle unit 88. The shaft 84 will extend through the tunnel section 26 of the frame 20 and will be substantially between the frame longitudinal members 22 and 24. Since the transmission is mounted in the rear of the vehicle rather than immediately back of the engine, the body floor pan will be provided with a relatively small hump as indicated in Figure 1 as compared to the floor board line and relatively large hump 90 which is required in vehicles now on the market. This construction assists in providing a relatively flat floor throughout the passenger compartment.

The front of the vehicle as illustrated in Figure 3 has the front cross member 28 secured to the underside of the frame longitudinal member 24. The engine 86 is mounted to the cross member 28 by means of the engine mounts 92. The body mount 36 may be provided on a pedestal 94 in order to receive the mounting arm 66 at a point above the suspension spring 96 by which the vehicle weight is transmitted to the wheel 98. Control arms 100 and 102 may be of conventional construction to provide proper front wheel suspension geometry and control. A shock absorber 104 may extend between the lower control arm 100 and the cross member 28 to a point substantially under mount 36. By providing mounts 34 and 36 directly over the front springs, the frame structural requirements are greatly simplified since the suspension forces are carried directly into body structure. This is also accomplished at the rear mount since this mount is located at the center of the spring cross member 30 midway between the rear vehicle springs. Thus the mounts are also located above the axes of the front and rear wheels respectively.

Figure 4:
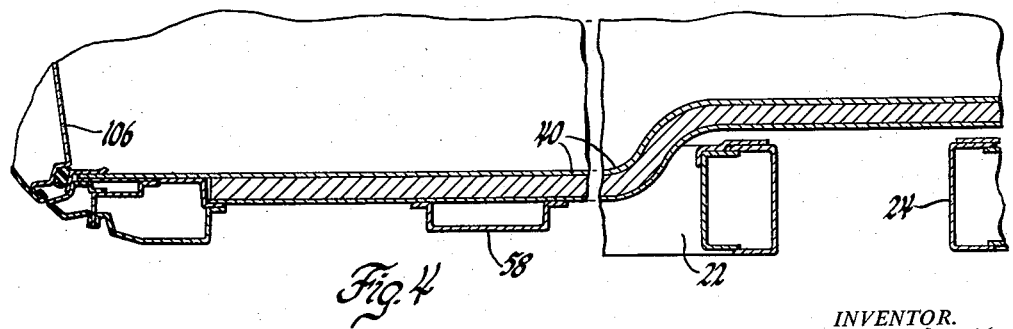
Figure 4 is a partial section view of the vehicle as taken in the direction of arrows 4—4 of Figure 1.

As can best be seen in Figure 4, the construction provides for a relatively flat floor board within the passenger compartment and does not require heavy side sill members to carry the board loads. Thus the vehicle doors 106 may open directly onto the floor rather than several inches above the floor, so that a step-over arrangement is eliminated. At the same time the vehicle overall height is not increased.

A vehicle has thus been disclosed which will permit an improvement in seating comfort by allowing thicker seats to be used because of a reduced drive line bump, and ease of vehicle entry by provision of a substantially flat floor extending the entire width of the vehicle so that the step-over sills are eliminated. The vehicle riding qualities are improved by the use of a mounting system which is made possible by constructing the vehicle body as a bridge-truss unit. The trunk overhang of the vehicle body may be supported vertically on steady rests 108 on cross member 32 but the body is not tightly attached at these points. The vehicle is therefore constructed with an increased interior height while maintaining an overall exterior height of approximately the same amount as that in current vehicles.

What is claimed is:

1. In a vehicle, a chassis including a frame and a front wheel suspension and engine mounting assembly and a rear wheel suspension and transmission and axle assemblies, said frame being attached to said assembly and holding said assemblies in the desired spaced relation, a vehicle body comprised of a floor pan, a fire wall, a roof panel, a back-light, a deck, body side and rear panels, a pair of front mounting arms secured to and extending forwardly from said body fire wall, a mounting pad on each of said mounting arms and mounting said body to said chassis at two transversely spaced points substantially over said front assembly, and rear mounting means on said floor pan and mounting said body to said chassis substantially over said rear assembly, said body providing a truss-type load support unit for the weight of said body and its contents.

2. In a motor vehicle, a chassis unit comprised of a frame and a front wheel and engine mount assembly and a rear wheel and transmission mount assembly, said frame tying said front and rear assemblies together in the desired spaced relation, a body unit comprised of side and rear panels, a floor board section, a fire wall, a roof section, a windshield connecting said fire wall and said roof section, and a back-light operatively connecting said roof to said side and rear panels and said floorboard section whereby said body unit loading provides tension in said floorboard section and compression in said roof and windshield and back-light sections to support the entire weight of said body unit, a pair of mounting arms secured to and extending forwardly from said fire wall section and a rear mount on said floorboard section, said body unit being mounted by said arms to said chassis substantially over said front assembly and by said rear mount to said chassis substantially over said rear assembly so that substantially all compression and tension body beam load forces remain within said body unit.

3. In a motor vehicle, a vehicle body having a floorboard, a fire wall, a windshield, a roof, a back-light, and rear and side body panels defining a cargo department, a pair of laterally spaced body mount arms secured to said fire wall and extending forwardly thereof, a body mount cross member secured underneath said floorboard adjacent the rear of said body, at least two tension stringer members secured to the underside of said floorboard and extending between and connecting said body mount arms and said cross member, and body mount means on each of said body mount arms and on said cross member for supporting said body on a vehicle frame whereby said body carries substantially all of the tension and compression truss loads exerted by the weight of the body and cargo carried therein.

4. In the motor vehicle of claim 3, said windshield and roof and back-light being secured in substantially solid compression relationship whereby the vehicle body exerts truss-like compression loads through said windshield and said roof and said back-light.

5. In a motor vehicle having body and a frame, said body having a floorboard and a fire wall, a pair of laterally spaced front body mounting arms secured to and extending forwardly of said fire wall and having mounting means thereon mounting the forward end of said body to said frame, a rear mounting cross member secured underneath said floorboard and having mounting means thereon securing the rear of said body to said frame, and a pair of tension stringer members connecting said front mounting arms and said rear mounting cross member and extending underneath said floorboard, said tension stringer members having an inverted flat channel formation and carrying substantially the entire tension forces exerted in said vehicle due to vehicle loading and weight, said floorboard extending laterally outward beyond said frame and said tension members and having a substantially flat upper surface providing the vehicle body floor.

6. In a motor vehicle having a load carrying body and a frame including a front cross member and side rails, the front end of said body having laterally spaced body mounts secured to said front cross member outwardly of and above said frame side rails, a vehicle engine mounted on said front cross member, and vehicle suspension means secured to said frame front cross member and including upper control arms pivotably connected to said front cross member intermediate said frame side rails and said mounting means and lower control arms pivotably connected to said cross member inwardly of and underneath said frame side rails and resilient suspension and shock absorbing means supporting said front cross member underneath said body mounting means and being supported on said lower control arms whereby the weight of said body is transmitted from said body mounting means vertically through said front cross member to said resilient suspension means.

References Cited in the file of this patent

UNITED STATES PATENTS

| | | |
|---|---|---|
| 1,439,802 | Miranda | Dec. 26, 1922 |
| 1,707,268 | Kelsch | Apr. 2, 1929 |
| 2,138,114 | Nelson | Nov. 29, 1938 |
| 2,497,261 | Hicks | Feb. 14, 1950 |
| 2,827,327 | Lindsay | Mar. 18, 1958 |
| 2,842,394 | MacPherson | July 8, 1958 |

FOREIGN PATENTS

| | | |
|---|---|---|
| 476,100 | Great Britain | Dec. 1, 1937 |
| 514,391 | Great Britain | Nov. 7, 1939 |